UNITED STATES PATENT OFFICE.

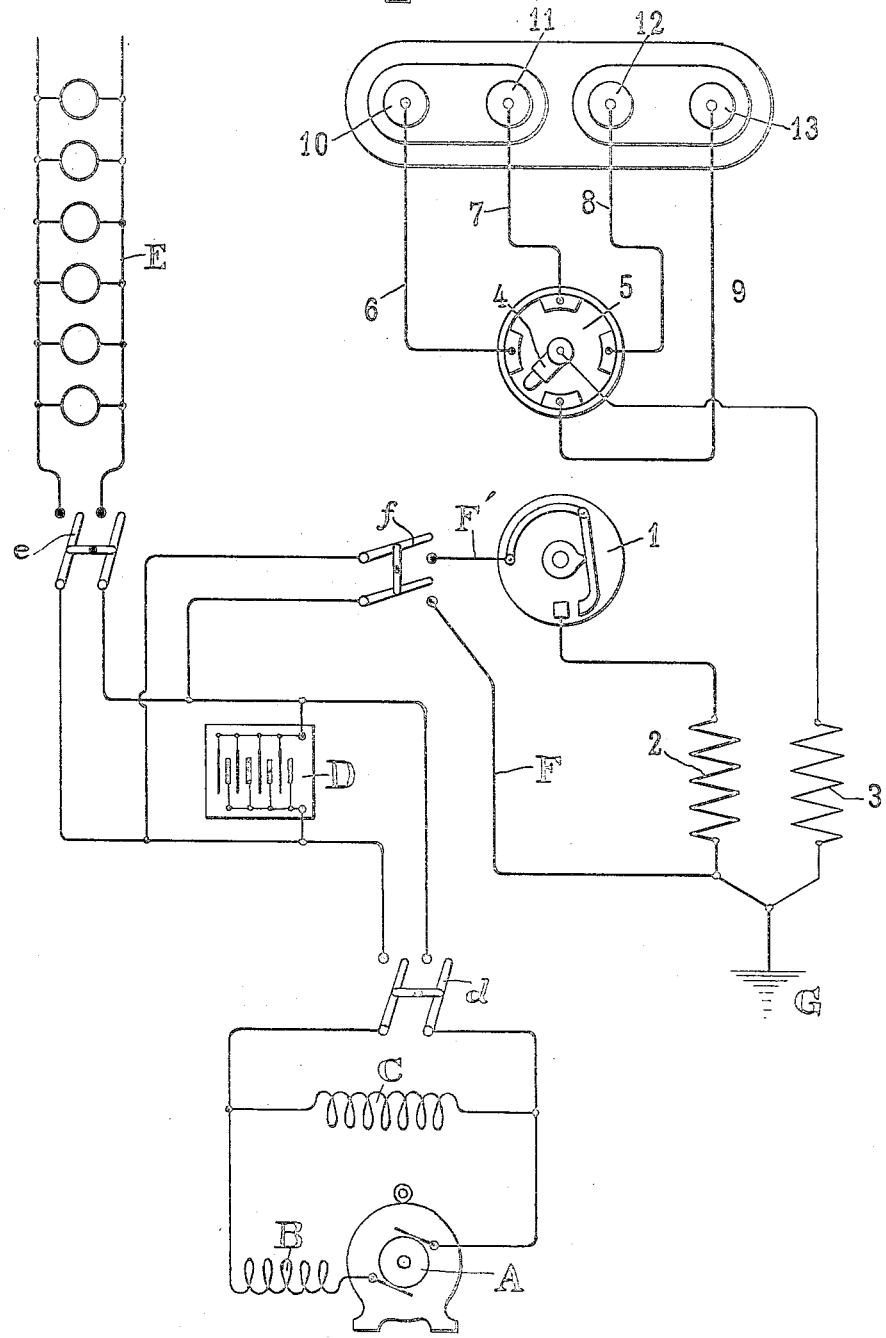

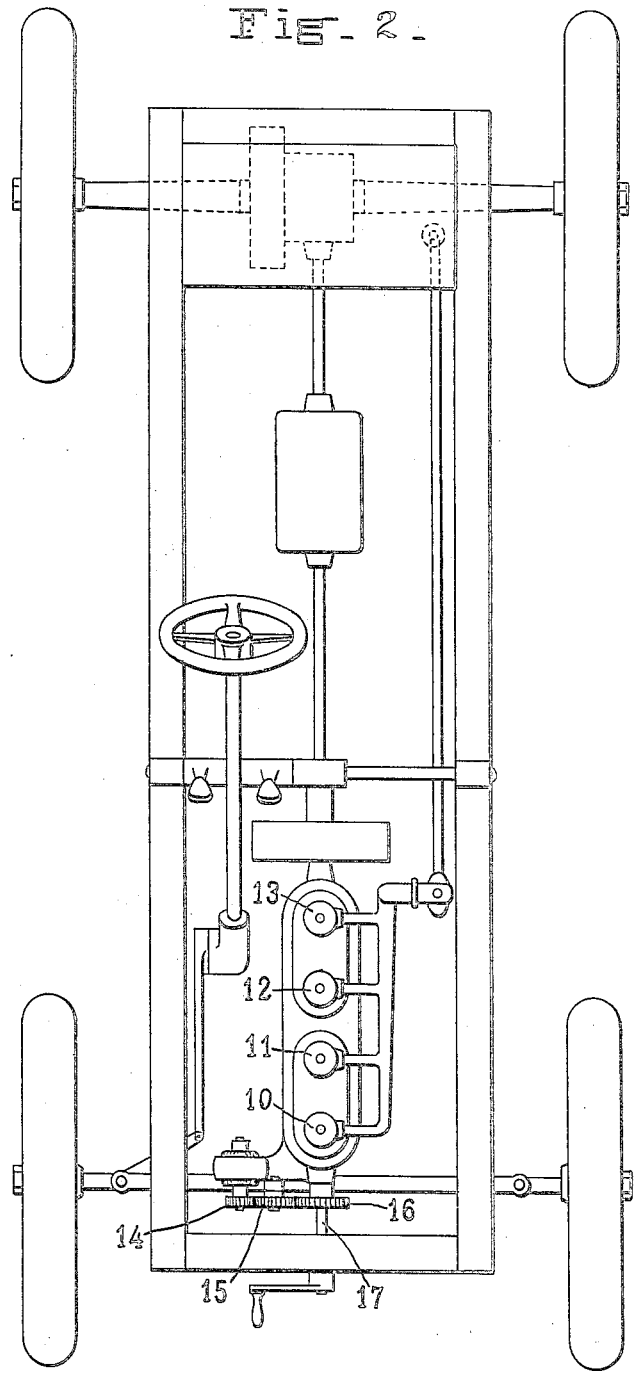

JOHN ALLEN HEANY, OF FLINT, MICHIGAN, ASSIGNOR TO LINDSAY AUTO PARTS COMPANY, OF INDIANAPOLIS, INDIANA, A CORPORATION OF INDIANA.

ELECTRIC STARTING AND SUPPLY SYSTEM FOR AUTOMOBILES.

1,287,988.  Specification of Letters Patent.  Patented Dec. 17, 1918.

Application filed July 28, 1910. Serial No. 574,216.

*To all whom it may concern:*

Be it known that I, JOHN ALLEN HEANY, a citizen of the United States, and a resident of Flint, in the county of Genesee and State of Michigan, have invented certain new and useful Improvements in Electric Starting and Supply Systems for Automobiles, of which the following is a full, clear, and exact description, whereby any one skilled in the art may make and use the same.

The invention relates to a starting and supply mechanism for automobiles and more particularly to an electrical apparatus by which the engine of the automobile may be given its initial impulse and will thereupon react through suitable translating devices for furnishing a source of electrical energy for supplying ignition, lighting or other current.

It relates more particularly to a dynamo electric machine so arranged and wound that it may act either as a compound wound motor for starting the engine or as a differentially wound generator for providing current at a substantially constant potential for load circuits.

The object of the invention is to provide an electrical apparatus in conjunction with an internal combustion engine which will give the desired starting movement to the engine shaft for securing initial compression and impulse of the pistons for starting the engine, and will also give a substantially constant potential current of electricity for storage, ignition, or lighting purposes.

A further object is to combine a differentially wound generator with an internal combustion engine through connections by which said generator may be actuated as a compound motor for starting the engine.

Referring to the drawings:

Figure 1 is a diagrammatic view of the various elements employed.

Fig. 2 is a plan view somewhat in diagram of an automobile chassis showing the relative arrangement of the dynamo electric machine and engine.

Electrical apparatus has been shown in the art for the purpose of providing electric current in connection with internal combustion engines and such devices have been shown and used, wherein various means have been provided for maintaining substantially constant speed effects upon the armature shaft, even though the speed of the engine shaft varies. It is also old in the art to provide distinct windings to form the fields of a dynamo electric machine, one winding being effective for producing a starting torque of the armature with a maximum force and a second individual winding for producing a different field strength so that the same machine may be used for generating current at higher speeds than those normally attained by said machine when it is used as a motor.

Such devices have various disadvantages. For instance, automatic controlling devices for causing variations in speed between the engine shaft and motor are more or less uncertain in action. Where various field windings are employed to give fields of different intensity used when the dynamo electric machine is used as a dynamo or as a motor, it requires controlling devices for varying the electric connections.

It is therefore the principal object of the present invention to provide a simple and compact arrangement which will obviate as far as possible the above indicated disadvantages. It embodies briefly a source of electrical supply, a dynamo electric machine differentially wound and provided with gear or other suitable connections intermediate the armature shaft and the shaft of the engine with ignition circuits, lighting circuits and controlling switches therefor. The whole electrical device is so arranged that it gives a maximum starting torque when connected as a motor and yet when operating as a generator will give a substantially constant voltage so that there is no danger of over-charging the source of supply or burning out lamps, coils, or other apparatus, no matter what the variations in speed of the engine are.

This present application is limited to a combination of elements including power translating means for starting an internal combustion engine, the generation of electrical energy as herein described for use in connection with internal combustion engines forming the subject-matter of my copending application filed July 27, 1910, Serial No. 574,030.

In the accompanying drawings A indicates the armature of the dynamo electric machine, B, the series field windings and C, the shunt field winding.

D, indicates a storage battery which may be connected across the terminals of the generator through a switch $d$, and may be connected to a load circuit as, for instance, the lighting circuit E, through a switch $e$. It may also be connected to an ignition circuit F, F', through a switch $f$.

In practice, the switch devices $f$ and $d$ may be of any well-known character commonly used for controlling a plurality of electric circuits and the lead-in or circuit wires to said switch should preferably be so arranged that the generator circuit will be connected with the storage battery D only when the ignition circuit is closed to operate the engine. It is apparent that this arrangement is advantageous. In order that the circuit of the generator and battery will not be closed when the engine is at rest, inasmuch as under such conditions, there would be a battery discharge through the generator.

The ignition circuit may be of any of the desired types and as illustrated herein, comprises a make and break device 1, connected with the primary coil 2, the secondary coil 3, being connected with the movable member 4, of the distributer 5, which has a series of stationary contacts connected by circuit wires 6, 7, 8, 9, with the insulated members of the spark plugs of the several cylinders 10, 11, 12, 13. The opposing member of the spark plugs is, of course, grounded in the frame of the engine and chassis, as is also the coil as indicated at G.

The dynamo electric machine has its armature A, connected through gears 14, 15, 16, with the main shaft 17, of the engine and this gearing forms a direct gear-connection between the two shafts so that the dynamo electric machine will either drive the engine shaft when it is operating as a motor, the necessary current being supplied by the battery D, or will be driven by the engine shaft as soon as said shaft attains a normal speed.

In ordinary generators, the voltage increases nearly in direct proportion with the speed of the armature. It follows that at low speeds, the electro-motive force generated is less than that of the storage battery or source of supply, and the latter will, of course, discharge through the armature. The electro-motive force of the generator at high speed rises to such a degree as to cause an abnormal current to flow through the storage battery and other devices, thus excessively over-charging the battery and injuring it or breaking down the other apparatus connected in the circuits.

To overcome these disadvantages as heretofore stated, various forms of mechanical friction clutches, mechanical and electrical cut-outs, etc., have been used, but these have uncertain action.

In the differentially wound dynamo electric machine proposed herein, the electromotive force remains substantially constant throughout the various speed ranges to which the armature is subjected. In addition to the shunt field winding, there is arranged a series field winding designed to produce a field excitation which is opposed to that of the shunt winding and always less than the latter within the limits of speed variation normally employed. That is, the generator is differentially wound and as the speed of the armature increases and the electro-motive force tends to increase, there will be a rise in the current through the armature and series winding, thus creating an increase in the series field excitation. This is opposed to the excitation induced by the shunt field winding and consequently decreases the resultant field. Inasmuch as the electromotive force of the generator is proportional to the product of the armature speed and the strength of the field, it is apparent that increase in the speed of the armature shaft, tending to increase the electro-motive force, produces a decreased field strength and therefore maintains an electro-motive force of approximately constant value in the system to which the generator is connected.

The ideal conditions for the above control are secured by making the shunt excitation equal to or less than the value corresponding to the break in the magnetization curve of the material in the field core. Thus, the resultant excitation ranging from a low value to this point, as a maximum, will produce a field strength in direct proportion to it, inasmuch as between these values, the magnetization curve is nearly a straight line.

If the engine is at rest, by closing the ignition circuit switch $f$, and the line circuit switch $d$, the current of the storage battery will flow through the dynamo electric machine, causing it to act as a compound wound motor. The current is now flowing in the opposite direction through the series field windings, and the dynamo electric machine will act as a motor with a sufficient torque to drive the engine shaft. The ignition circuit being closed, the engine will continue to operate and as soon as it attains a sufficient speed, will again drive the dynamo electric machine as a generator supplying the system to which the generator is connected with current at such an approximately constant potential that the battery, ignition apparatus, lamps or any other current translating devices included in the system will not be subjected to any injurious effects.

Obviously, the various details of connections between the dynamo electric machine and shaft as well as the controlling devices for the various circuits, might be of any well-known character or design and various changes as to these details might be made without departing from the spirit or intent of the invention.

The dynamo electric machine occupies the same relative position on the engine as the ordinary magneto which is commonly employed for simple furnishing an ignition current and in the form described, may be of a size and capacity which may be utilized as a starting motor due to the compounding and as an efficient and proper generator of constant voltage due to the differential windings. It will be noted that the storage battery is ordinarily charged or is floating on the line except, of course, when the engine is at rest and the dynamo electric machine is cut out of the circuits to prevent discharge of the battery.

The particular embodiment of my invention herein disclosed is, of course, susceptible to considerable variation without departing from the spirit thereof, and it is to be understood that many changes might be made by those skilled in the art within the scope of the invention as defined in the appended claims.

What I claim as my invention and desire to secure by Letters Patent is:

1. In an automotive vehicle, the combination with a variable speed internal combustion engine, of an electrical system comprising a load circuit including a storage battery, a convertible dynamo-electric machine operatively connected to the engine and comprising a rotor the speed of which varies with the speed of the engine, and field exciting means connected to inherently control the excitation to maintain an approximately constant voltage in said circuit when connected thereto and driven at varying engine speeds to charge said storage battery, said exciting means being adapted to develop a high torque in said dynamo-electric machine when operated as a motor upon current from the storage battery to start the engine, and circuit closing means to connect the dynamo-electric machine with said storage battery for operation as a motor or as a generator.

2. In an automotive vehicle, the combination with a variable speed internal combustion engine, of an electrical system comprising a storage battery, translating devices, a convertible dynamo-electric machine operatively connected to the engine and comprising a rotor the speed of which varies with the speed of the engine, a commutator and stationary brushes and a field structure having exciting windings connected to inherently regulate the field flux density to maintain an approximately constant voltage in said system when connected thereto and driven at varying engine speeds to charge said storage battery, said exciting windings being adapted to develop a high torque in said dynamo-electric machine when operated as a motor upon current from the storage battery to start the engine, and circuit closing means to connect the dynamo-electric machine with said storage battery for operation as a motor or as a generator.

3. In an automotive vehicle, the combination with a variable speed internal combustion engine, of an electrical system comprising a storage battery, translating devices including an ignition system for said engine, a convertible dynamo-electric machine operatively connected to the engine and comprising a rotor the speed of which varies with the speed of the engine, and field exciting means connected to inherently control the excitation to maintain an approximately constant voltage in said system when connected thereto and driven at varying engine speeds to charge said storage battery, said exciting means being adapted to develop a high torque in said dynamo-electric machine when operated as a motor upon current from the storage battery to start the engine, and circuit closing means to connect the dynamo-electric machine with the said storage battery for operation as a motor or as a generator.

4. In an automotive vehicle, the combination with a variable speed internal combustion engine, of an electrical system comprising a storage battery, translating devices including an ignition system for said engine, connecting means between said storage battery and ignition system whereby current is supplied from said battery to the ignition system while the engine is being started, a convertible dynamo-electric machine operatively connected to the engine and comprising a rotor the speed of which varies with the speed of the engine, and field exciting means connected to inherently control the excitation to maintain an approximately constant voltage in said system when connected thereto and driven at varying engine speeds to charge said storage battery, said exciting means being adapted to develop a high torque in said dynamo-electric machine when operated as a motor upon current from the storage battery to start the engine, and circuit closing means to connect the dynamo-electric machine with the said storage battery for operation as a motor or as a generator.

5. In an automotive vehicle, the combination with a variable speed internal combustion engine, of an electrical system comprising a load circuit including a storage battery, electrical power translating means operatively connected to said engine for starting the same when supplied with electrical energy from said battery and for supplying electrical energy to said load circuit and battery when driven by said engine, and switch mechanism for controlling circuit connections between the electrical power translating means and the load circuit, said electrical power translating means including a rotor the speed of which varies with the speed of the engine, and field exciting means connected to inherently control the excitation to maintain an approximately constant voltage in said load circuit independent of speed changes of the rotor when said rotor is functioning to supply electrical energy to said load circuit and battery, and to cause a high torque to be developed during the starting of the engine.

6. In an automotive vehicle, the combination with a variable speed internal combustion engine, of an electrical system comprising a load circuit including a storage battery, electrical power translating means operatively connected to said engine for starting the same when supplied with electrical energy from said battery and for supplying electrical energy to said load circuit and battery when driven by said engine, and switch mechanism for controlling circuit connections between the electrical power translating means and the load circuit, said electrical power translating means including a rotor the speed of which varies with the speed of the engine, a commutator and stationary brushes and exciting windings connected to inherently regulate the field flux density to maintain an approximately constant voltage in said load circuit independent of speed changes of the rotor when said rotor is functioning to supply electrical energy to said load circuit and battery, and to cause a high torque to be developed during the starting of the engine.

7. In an automotive vehicle, the combination with a variable speed internal combustion engine, of an electrical system comprising a load circuit including a storage battery and ignition system for said engine, electrical power translating means operatively connected to said engine for starting the same when supplied with electrical energy from said battery and for supplying electrical energy to said load circuit and battery when driven by said engine, and switch mechanism for controlling circuit connections between the electrical power translating means and the load circuit, said electrical power translating means including a rotor the speed of which varies with the speed of the engine, and field exciting means connected to inherently control the excitation to maintain an approximately constant voltage in said load circuit independent of speed changes of the rotor when said rotor is functioning to supply electrical energy to said load circuit and battery, and to cause a high torque to be developed during the starting of the engine.

8. In an automotive vehicle, the combination with a variable speed internal combustion engine, of an electrical system comprising a load circuit including a storage battery and ignition system for said engine, electrical power translating means operatively connected to said engine for starting the same when supplied with electrical energy from said battery and for supplying electrical energy to said load circuit and battery when driven by said engine, and switch mechanism for controlling circuit connections between the electrical power translating means and the load circuit, said electrical power translating means including a rotor the speed of which varies with the speed of the engine, a commutator, a field structure having an exciting winding thereon directly connected to stationary brushes bearing on said commutator and a regulating winding thereon, said windings coacting to inherently regulate the field flux density to maintain an approximately constant voltage in said load circuit independent of speed changes of the rotor when said rotor is functioning to supply electrical energy to said load circuit and battery, and to cause a high torque to be developed during the starting of the engine.

9. In an automotive vehicle, the combination with a multiple cylinder variable speed internal combustion engine, of an electrical system comprising a load circuit including a storage battery, and an ignition system for said engine comprising a circuit breaker and distributer, electrical power translating means operatively connected to said engine for starting the same when supplied with electrical energy from said battery and for supplying electrical energy to said load circuit and battery when driven by said engine, and switch mechanism for controlling circuit connections between the electrical power translating means and the load circuit, said electrical power translating means including a rotor the speed of which varies with the speed of the engine, and field exciting means connected to inherently control the excitation to maintain an approximately constant voltage in said load circuit independent of speed changes of the rotor when said rotor is functioning to supply electrical energy to said load circuit and battery, and to cause a high torque to be developed during the starting of the engine.

10. In an automotive vehicle, the combination with a multiple cylinder variable speed internal combustion engine, of an electrical system comprising a load circuit including a storage battery and an ignition system for said engine comprising a circuit breaker and distributer and a convertible dynamo-electric machine operatively connected to the engine and comprising a rotor the speed of which varies with the speed of the engine, and field exciting means connected to inherently control the excitation to maintain an approximately constant voltage in said system when connected thereto and driven at varying engine speeds to charge said storage battery, said exciting means being adapted to develop a high torque in said dynamo-electric machine when operated as a motor upon current from the storage battery to start the engine, and circuit closing means to connect the dynamo-electric machine with the storage battery for operation as a motor or as a generator.

11. In an automotive vehicle, the combination with a multiple cylinder variable speed internal combustion engine, of an electrical system comprising a load circuit including a storage battery, an ignition system for said engine comprising a circuit breaker and a distributer, a convertible dynamo-electric machine operatively connected to the engine and comprising a rotor the speed of which varies with the speed of the engine, a commutator and stationary brushes, and a field structure having exciting windings connected to inherently regulate the field flux density to maintain an approximately constant voltage in said system when connected thereto and driven at varying engine speeds to charge said storage battery said exciting windings being adapted to develop a high torque in said dynamo-electric machine when operated as a motor upon current from the storage battery to start the engine, and circuit closing means to connect the dynamo-electric machine with the storage battery for operation as a motor or as a generator.

12. In an automotive vehicle which includes a variable speed internal combustion engine geared to the vehicle for driving the same, the combination of an electrical system comprising a load circuit including a storage battery, electrical power translating means operatively connected to said engine for starting the same when supplied with electrical energy from said storage battery and for supplying electrical energy to said load circuit and said battery when driven by said engine, and switch mechanism for controlling circuit connections between the electrical power translating means and the load circuit, said electrical power translating means including a rotor the speed of which varies with the speed of the engine, and field exciting means connected to inherently reduce the field flux density as the speed of the rotor increases to maintain an approximately constant voltage in said load circuit independent of speed changes of the rotor when said rotor is functioning to supply electrical energy to said load circuit and battery, and to cause a high torque to be developed during the starting of the engine.

JOHN ALLEN HEANY.

Witnesses:
FRED B. McLAREN,
EDWARD SIMON.